(12) United States Patent
Yamaji et al.

(10) Patent No.: US 8,782,506 B2
(45) Date of Patent: Jul. 15, 2014

(54) METHOD AND APPARATUS FOR CREATING ALBUM, AND RECORDING MEDIUM

(75) Inventors: Kei Yamaji, Ashigarakami-gun (JP); Hotsumi Ihara, Ashigarakami-gun (JP); Atsushi Misawa, Ashigarakami-gun (JP); Karin Kon, Ashigarakami-gun (JP); Yuko Suzuki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 610 days.

(21) Appl. No.: 12/411,141

(22) Filed: Mar. 25, 2009

(65) Prior Publication Data

US 2009/0249177 A1     Oct. 1, 2009

(30) Foreign Application Priority Data

Mar. 26, 2008    (JP) .................................. 2008-080391

(51) Int. Cl.
*G06F 17/00* (2006.01)

(52) U.S. Cl.
USPC ............................ 715/202; 715/203; 715/204

(58) Field of Classification Search
CPC ...................... G06F 17/30781; G06F 17/30843
USPC ................... 707/737; 715/204, 730, 246, 202
See application file for complete search history.

(56) References Cited

U.S. PATENT DOCUMENTS 5,758,049 A * 5/1998 Johnson et al. ............... 715/206
6,324,545 B1 * 11/2001 Morag .......................... 707/737
6,571,054 B1 * 5/2003 Tonomura et al. ............ 386/241
6,771,801 B1 * 8/2004 Fisher et al. .................. 382/112
7,224,892 B2 5/2007 Yashiro
7,840,898 B2 * 11/2010 Hua et al. ...................... 715/723
2004/0080670 A1 * 4/2004 Cheatle ......................... 348/441

(Continued)

FOREIGN PATENT DOCUMENTS

JP          2003-9069 A       1/2003
JP          2005-044127 A     2/2005

(Continued)

OTHER PUBLICATIONS

Japanese Office Action, dated Dec. 2, 2011, issued in Japanese Patent Application No. 2008-080391, 6 pages in English and Japanese, see p. 2 for relevance of cited document 1 (JP 2005-044127).

(Continued)

*Primary Examiner* — Doug Hutton, Jr.
*Assistant Examiner* — Brian Garmon
(74) *Attorney, Agent, or Firm* — Sughrue Mion, PLLC

(57) ABSTRACT

A required number of images for creating an album are compensated using existing still images, and an album with a fine appearance is created by effectively using a small number of available still images (still images in stock). A value N, which is obtained by subtracting the total number of selected images from the total number of images that a template of a photo album requires (the total number of combination frames), is determined as the minimum number of shortfall images that are required for compensating the shortage of images. An image (original image for creation) appropriate for the original, from which images for compensating the shortage of images are created, is selected from among selected images. New images are created by applying a predetermined image processing to the selected original image for creation, until the minimum number N of shortfall images is satisfied.

11 Claims, 16 Drawing Sheets

(56) References Cited

U.S. PATENT DOCUMENTS

| | | | |
|---|---|---|---|
| 2005/0240865 A1* | 10/2005 | Atkins et al. | 715/517 |
| 2006/0200744 A1* | 9/2006 | Bourke et al. | 715/500.1 |
| 2006/0210165 A1* | 9/2006 | Takemoto et al. | 382/190 |
| 2006/0259857 A1* | 11/2006 | Atkins | 715/517 |
| 2007/0019932 A1* | 1/2007 | King et al. | 386/121 |
| 2007/0263128 A1* | 11/2007 | Zhang | 348/700 |

FOREIGN PATENT DOCUMENTS

| | | |
|---|---|---|
| JP | 2005094527 A | 4/2005 |
| JP | 2006-74590 A | 3/2006 |
| JP | 2006-279643 A | 10/2006 |

OTHER PUBLICATIONS

Notification of Reasons for Rejection, dated Dec. 28, 2012, issued in related application JP 2012-018242, 4 pages in English and Japanese.

* cited by examiner

I2

I2-1

I2-2

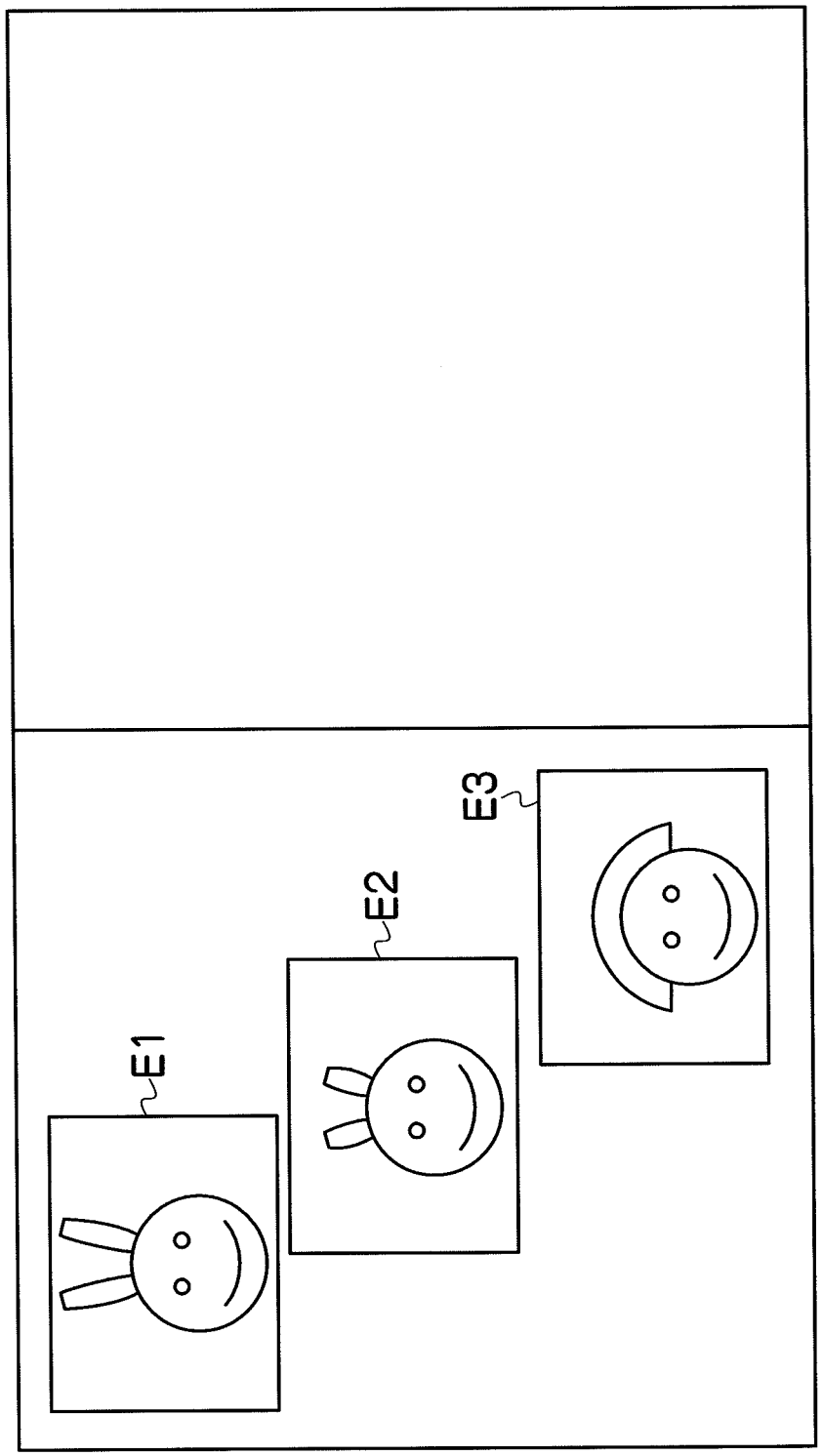

METHOD AND APPARATUS FOR CREATING ALBUM, AND RECORDING MEDIUM

BACKGROUND OF THE INVENTION

1. Field of the Invention

The present invention relates to creation of an album in which a predetermined number of images are disposed, and more particularly, relates to coordination of the number of images to be disposed in the album.

2. Description of the Related Art

As conventional arts creating an album by electronically disposing images, Japanese Patent Application Laid-Open No. 2006-74590 and 2006-279643 are disclosed. In Japanese Patent Application Laid-Open No. 2006-74590, the number of images per page is obtained based on the number of total pages and the number of images, and the images are distributed among pages. It should be noted that the number of total images to be disposed in the album falls within a predetermined range.

In Japanese Patent Application Laid-Open No. 2006-279643, user images are analyzed, a plurality of alternatives of trimming regions are displayed, one of the alternatives is selected, and trimming processing is executed.

On the other hand, conventional arts creating still images from a moving image include Japanese Patent Application Laid-Open No. 2003-9069. In Japanese Patent Application Laid-Open No. 2003-9069, still images are created from a moving image, and the still images are grouped based on the degree of similarity of the still images.

SUMMARY OF THE INVENTION

Creation of an album having a fine appearance as a whole requires a predetermined number or more of images. However, the creation is difficult when a user only has a small number of available images (images in stock). As to this point, Japanese Patent Application Laid-Open No. 2006-74590 only distributes existing images among pages. Japanese Patent Application Laid-Open No. 2006-279643 can obtain only one trimmed image from an image, and gives no consideration on measures against a shortage of images.

When the user has no still images on reserve but only has moving images, there may be a difficulty how to select images in order to obtain images suitable for an album as many as the shortfall.

It is an object of the present invention to supply a required number of images for creation of an album by using a small number of available still images (still images in stock), and create the album with a fine appearance by efficiently using a small number of still images.

It is another object of the present invention to supply a required number of images for creation of an album by using an existing moving image, and create the album with a fine appearance by efficiently using the moving image.

According to an aspect of the present invention, a method for creating an album in which one or more images are disposed, comprises: a step of obtaining one or more original images; a step of determining a number of shortfall images by comparing a number of images required for creating the album and the number of the obtained original images; a step of creating one or more compensating images at least as many as the shortfall images by applying a predetermined image processing to the obtained images, and a step of creating the album based on at least one of the original images and the compensating images.

The predetermined image processing includes trimming around a subject region, combination of a background, combination of graphics representing a facial expression, switching viewpoints by pseudo-three-dimensional processing, or morphing.

The method may further comprise: a step of obtaining one or more selected images by selecting images which satisfy a predetermined condition from among the original images; a step of creating the compensating images at least as many as the shortfall images by applying the predetermined processing to the selected images; and a step of creating the album based on at least one of the original images, the compensating images, and the selected images.

According to another aspect of the present invention, a method for creating an album, comprises: a step of obtaining a moving image and a representative image which is a still image captured from the moving image; a step of determining a minimum number of images required for creating the album in which one or more images are disposed in a predetermined template; a step of creating one or more still images which belong to the same scene as the representative image belongs to by applying a predetermined image processing to the obtained moving images; and a step of creating the album based on at least one of the still images which belong to the same scene as the representative image belongs to.

The present invention also includes a program which controls a computer to execute the method for creating an album according to any one of the aspects. Further, the present invention also includes a recording medium on which a program is stored, the program controlling a computer to execute the method for creating an album according to any one of the aspects.

According to further another aspect of the present invention, an apparatus for creating an album in which one or more images are disposed, comprises: a device which obtains one or more original images; a device which determines a number of shortfall images by comparing a number of images required for creating the album and the number of the obtained original images; a device which creates one or more compensating images at least as many as the shortfall images by applying a predetermined image processing to the obtained images; and a device which creates the album based on at least one of the original images and the compensating images.

According to further another aspect of the present invention, an apparatus for creating an album comprises: a device which obtains a moving image and a representative image which is a still image captured from the moving image; a device which determines a minimum number of images required for creating the album in which one or more images are disposed in a predetermined template; a device which creates one or more still images which belong to the same scene as the representative image belongs to by applying a predetermined image processing to the obtained moving images; and a device which creates the album based on at least one of the still images which belong to the same scene as the representative image belongs to.

Accordingly, according to any one of the aspects of the present invention, the shortage of images can be compensated by applying a predetermined image processing to existing images. In particular, an album with a fine appearance can be created, by compensating the shortage of images, using trimmed images focusing on a subject in an image, combination of an illustration corresponding to a subject in an image, an image viewed from a different viewpoint by creating a pseudo-three-dimensional object, an intermediate image created by morphing representing a state in which an object is changing, or an image which belongs to the same scene to which a representative image belongs and is captured from a moving image.

BRIEF DESCRIPTION OF THE DRAWINGS

FIG. 18 is a diagram showing an appearance in which morphed images are disposed in a template;

DETAILED DESCRIPTION OF THE PREFERRED EMBODIMENTS

Figure 1:
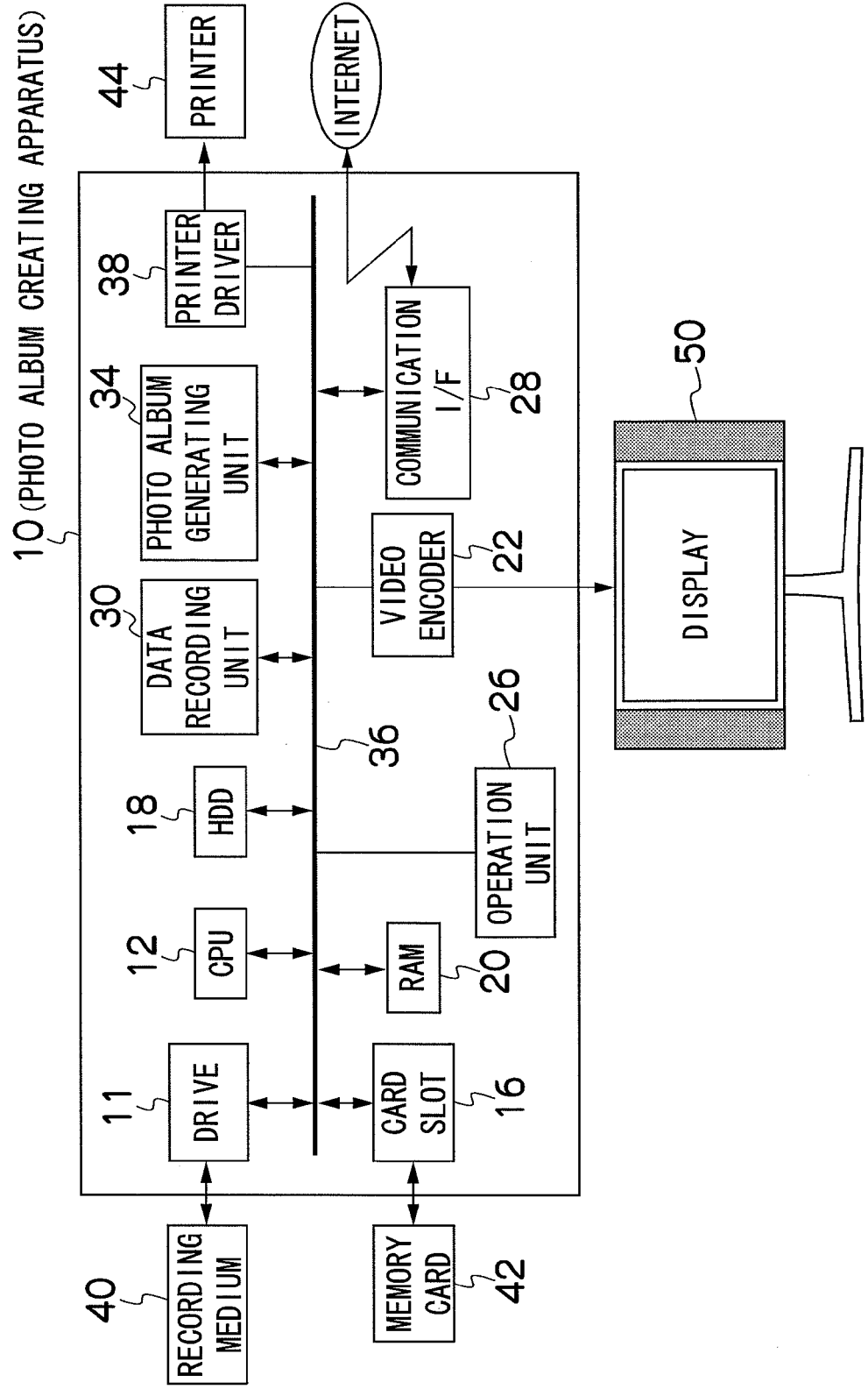
FIG. 1 is a diagram showing a configuration of an image editing apparatus.

FIG. 1 is a block diagram showing a schematic configuration of a photo album creating apparatus 10 to which the present invention is applied. The photo album creating apparatus 10 reads moving or still image data (including still images created by capturing moving images) stored on, for example, various kinds of a recording medium 40 such as a CD or a DVD, a memory card 42 or the like. Using these images as materials, a photo album (data that causes a display device to display images with a predetermined layout and design, or a printed medium on which images are printed with a predetermined layout and design) is created. The photo album creating apparatus 10 is operated using an operation unit 26 that includes various kinds of operation devices such as a pointing device capable of indicating movements concerning a pointer (cursor) of a mouse, a touch pad or a trackball, a keyboard, a touch panel and the like.

The photo album creating apparatus 10 includes a CPU 12 controlling the photo album creating apparatus 10 in its entirety, a drive 11 reading and writing data from and into the recording medium 40, a card slot 16 reading and writing through which data is read and written from and into the memory card 42, a hard disk drive (storing medium) 18 (hereinafter referred to as an HDD 18) storing programs controlling the photo album controlling apparatus 10 and moving and still images and the like, a RAM 20 functioning as working memory when the CPU 12 executes various kinds of processing, various kinds of graphical user interfaces related to editing of images such as a window including a list of images stored on the RAM 20 and after-mentioned template images, a video encoder 22 outputting a video signal and causing a display 50 to display the video signal which signal is of the pointer moving on the window according to input operation including indication concerning a moving direction and a moving velocity from the operation unit 26, a communication I/F 28 for connecting to networks such as the Internet, and a data recording unit (operational history recording device) 30 that takes charge of respective special processes. These devices are connected to each other via bus 36. The CPU 12 centrally controls every device of the apparatus according to an operation program stored in HDD 18.

To the photo album creating apparatus 10, a printer 44 that prints designated still images on a sheet of normal paper, photographic paper or the like is connected via a printer driver 38.

The card slot 16 detachably holds the memory card 42 such as, for example, a compact flash (registered trademark), a SD card, a smart media or the like, reads and writes still image data and the like stored on these memory cards. This configuration thereby allows the apparatus to read still image data picked up by a digital still camera or the like. A communication port, e.g. a USB, IEEE 1394 or the like, may be provided to directly communicate with electronics devices such as a digital still camera, a PDA and the like, via wire, in addition to the multi-drive 11 and the card slot 16.

Figure 2:
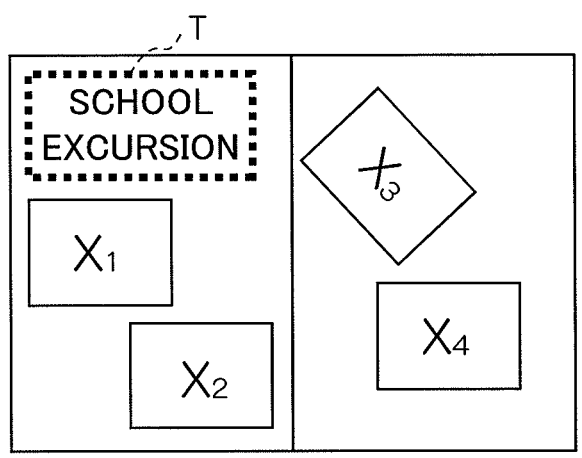
FIG. 2 is a diagram showing an example of a template.

The HDD 18 stores, in addition to one or more still image data used as materials of the photo album, decoration image data and the like to be combined with these still image data when the photo album is generated. The decoration image prescribes a mask image to cover unnecessary portions of target image and a frame for fitting the target images, and includes a template image (see FIG. 2) decorated with illustrations. These decoration images provide the photo album with a beautiful hue by decorating the background of the still images used as materials and providing specific points of decorations.

In the template, a predetermined number of combination frames X1, X2, . . . are provided, and selected still images are sequentially disposed in the combination frames according to an arbitrary prescribed disposition. The photo album is perfected by disposing the images in all of the combination frames. It should be noted that occurrence of a blank in the combination frame is not allowed. An image of some kind should be disposed in the frame.

Each still image data is stored in the HDD 18 in an image file format, e.g., the JPEG or the TIFF or the EXIF prescribed for a digital still camera. These image files provide a data region storing still image data and a tag region storing meta data that indicates the content of the data and the like. Hereinafter, the still image data is simply referred to as "image."

The moving image data conform to compression-recording standards such as the motion JPEG, the MPEG4 and the like.

The communication I/F 28 connects the photo album creating apparatus 10 to the Internet, causes a display 50 to display web pages on the Internet, and transmits and receives image data via e-mail (hereinafter referred to as mail). The communication I/F 28 includes a modem conforming to broadband. The communication I/F 28 may be what connects to the Internet via an optical communication network, a cable network or the like. The photo album generated by a photo album generating unit 34 can be distributed to a predetermined terminal via the Internet.

A data recording unit 30 and the photo album generating unit 34 are so-called coprocessor, and take charge of respective special processes to support processing operations of the CPU 12.

If the photo album creating apparatus 10 is a shop-front print terminal, the photo album, which is generated by the photo album generating unit 34 and outputted to the display 50 and displayed as a preview, can be outputted on a printing medium by the printer 44, or copied on the recording medium 40 such as a DVD capable of recording the photo album as video data, according to designation by the user, after the content is confirmed. If the photo album creating apparatus 10 accepts an order of a photo album from a terminal connected via the Internet from the outside, the preview of the photo album, instead of being displayed on the display 50, may be converted into a web page that the terminal can display and then be transmitted to the terminal. Without considering output on a recording medium or a printing medium, the perfected photo album may be displayed on various types of electronics devices such as a cellular phone, a digital camera and the like as one of their functions for displaying a photo album.

It should be noted that the system configuration shown in FIG. 1 is an exemplary one. Another electronics device (e.g. a cellular phone or a PDA) that has a similar configuration can execute the present invention.

Figure 3:
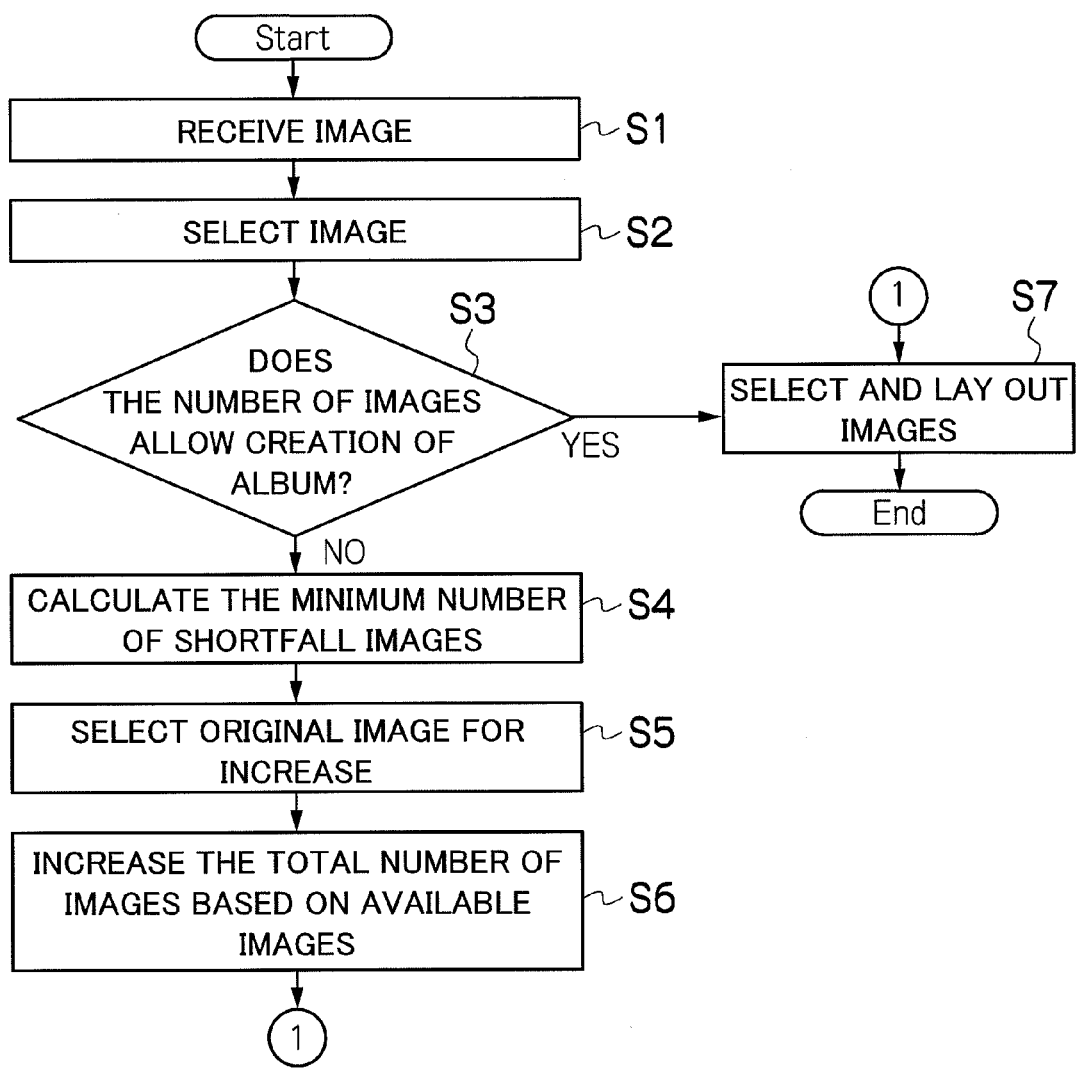
FIG. 3 is a flowchart showing a processing of creating a photo album.

Hereinafter, a flow of processing of creating the photo album will be described according to a flowchart shown in FIG. 3. The processing is executed by the photo album generating unit 34 (or the CPU 12). A program controlling the photo album generating unit 34 to execute this processing is recorded on a computer-readable recording medium such as the HDD 18 and the RAM 20. This program may be downloaded from the outside via the Internet.

In step S1, images to be disposed in the photo album is read from the recording medium 40, the memory card 42, or a terminal connected to the communication I/F 28 from the outside via the Internet, and then stored on HDD 18. The images include, as well as still image files such as JPEG files, images captured from moving images.

In step S2, images that satisfy a condition suitable for creating a photo album are selected from among the original images stored in the HDD 18. For example, images that satisfy a predetermined condition (with 800 million pixels or more, without camera shake and out-of-focus, without backlight) are determined, and the images satisfying the condition are selected from among the stored images and separately stored in the HDD 18 as selected images distinguished from the original images. The predetermined condition may be arbitrarily designated by the user using the operation unit 26. The user may arbitrarily designate whether the processing in step S2 is executed or not using the operation unit 26. The determination of occurrence of out-of-focus and camera shake can be executed according to well-known arts (e.g., see Japanese Patent Application Laid-Open No. 2005-332382).

In step S3, the minimum number of images required for creating the photo album (the total number of combination frames) and the total number of the above-mentioned selected images are compared, and it is determined whether or not the minimum number of selected images required for creating an album are secured. If secured, the processing advances to the step S7. If not secured, the processing advances to the step S4.

In step S4, the value N obtained by subtracting the total number of above-mentioned selected images from the total number of images required for the template of the photo album (the total number of combination frames) is provided as the minimum number of shortfall images that is the minimum number of images required for compensating the shortage of the images.

In step S5, suitable images as originals for compensating the shortfall images (original images for creation) are selected from among the selected images. For example, images with a plurality of subjects, images with fine image quality and the like (e.g. without red-eye) are selected. This processing will be described below in detail. If the image quality is used as the selecting condition, the condition can be less strict, strict, or what have no relationship with the processing in FIG. 2. The condition may arbitrarily be designated by user.

In step S6, new images are generated by applying a predetermined image processing to the original images for creation selected in step S5 until the number of images reaches the minimum number of shortfall images N. This processing will be described below in detail.

Figure 6:
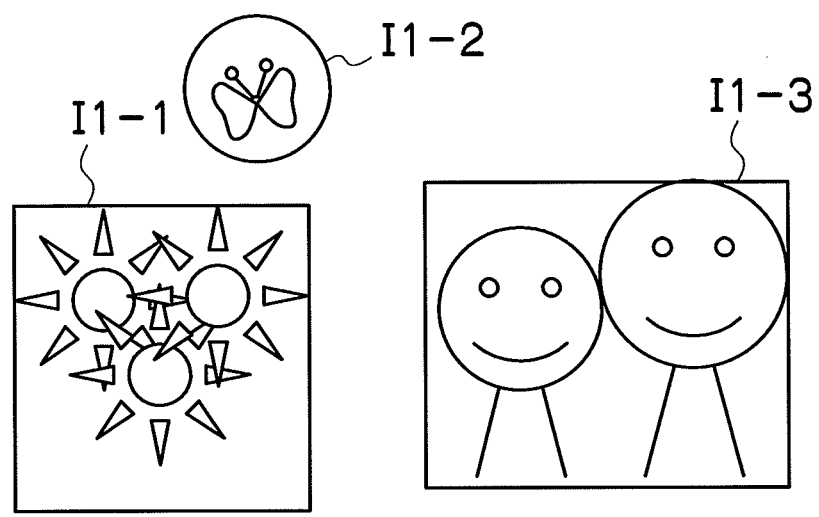
FIG. 6 is a diagram showing an example of trimmed images.

In step S7, the images generated in step S6 and the original selected images are disposed in the combination frames in the template in a desired order, and the two images are combined together. If the images generated in FIG. 6 are sufficient to reach the minimum number of shortfall images N, it is unnecessary to dispose the original selected images. The images may be automatically disposed according to an order such as an order of photographing date, or be disposed according to designation through the operation unit 26.

It is unnecessary to identically match the number of images to be generated in FIG. 6 with the minimum number of shortfall images N. Instead, the number may be more than N. In this case, in step S7, it may be selected which images of the original selected images (the images obtained in step S1 when the step S2 is not executed) and the generated images are disposed in the album through operation to the operation unit 26. When redundant images are generated, the user is free to select images for use from among these images. The user may use all of the images or only a certain number of images. The album may be created by only using the generated images without using any of the original selected images (the images obtained in step S1 when the step S2 is not executed). In other words, it is unnecessary to dispose all of the images generated in step S6 in the album. It is preferable to provide the user with choices allowing user to select images that the user likes and to designate the selected images in the album.

Hereinafter, the processing in steps S4 and S5 will be described in detail. Various types of exemplary embodiments can be employed in this processing.

According to a first exemplary embodiment, in step S4, an image in which a plurality of subjects are photographed is selected. In step S5, regions including respective subjects are set as trimming regions, images are cut out along the set trimming regions, and a plurality of trimmed images corresponding to respective subjects are obtained.

Figure 4:
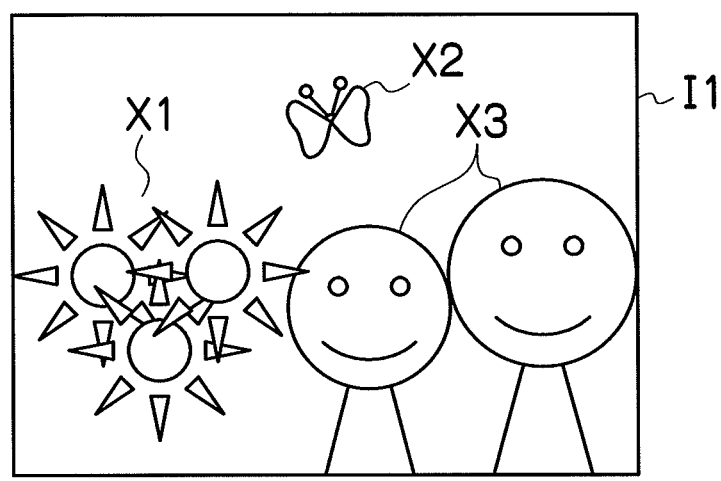
FIG. 4 is a diagram showing an example of a selected image in which a plurality of subjects exist.

For example, three subjects, or a flower X1, a butterfly X2 and a person X3, are recognized in the selected images I1 shown in FIG. 4. A well-known art can be used for recognizing a subject. For example, a specific image value of a sample subject is stored in the HDD 18, and it is recognized that a specific subject exists by pattern-matching the specific image value and the image value of the selected image. If the recognized subjects are plural, the corresponding selected images are selected as the original images for creation.

Figure 5:
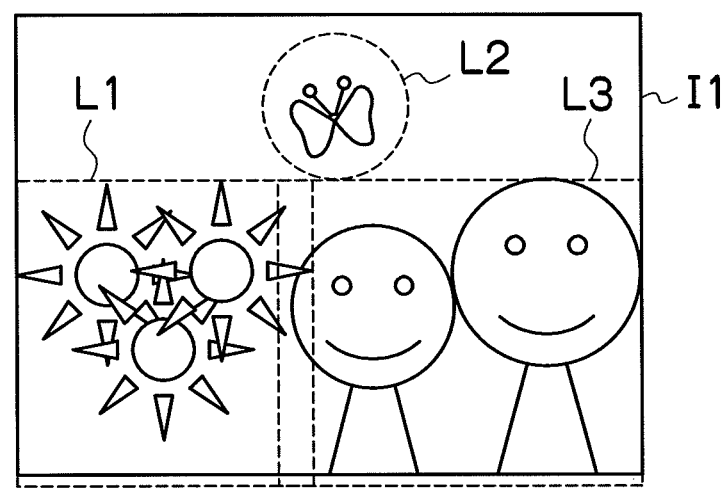
FIG. 5 is a diagram showing an example of trimming regions separately including the plurality of respective subjects.

Next, a plurality of trimming regions that separately include respective subjects recognized in the original images for creation are set on the original image for creation. In FIG. 5, three respective trimming regions L1, L2 and L3 that separately include the flower X1, butterfly X2 and person X3 in the original image for creation 11 are set. The shape of the trimming region may be rectangular or circular and not be restricted. The shape may conform to the combination frame into which the image is fitted. The trimming region may be designated or changed by the user using the operation unit 26. It is unnecessary to restrict the images to be created to only one. Instead, the more images, the better.

As shown in FIG. 6, the original image for creation I1 is trimmed along the three trimming regions L1, L2 and L3, and three trimmed images I1-1, I1-2 and I1-3 are obtained.

Figure 7:
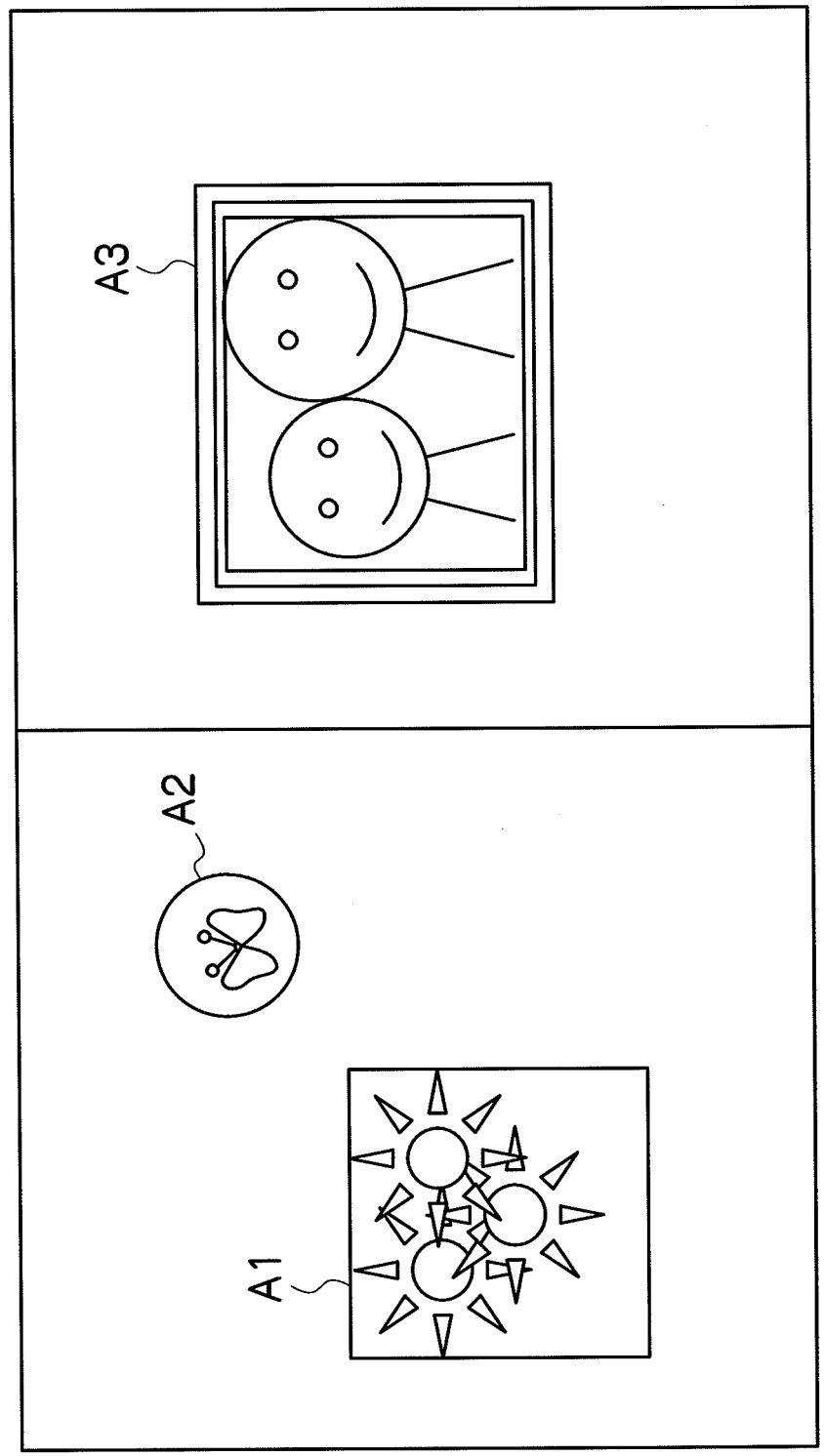
FIG. 7 is a diagram illustrating an appearance in which the trimmed images are disposed in a template.

After that, as shown in FIG. 7, the trimmed images I1-1, I1-2 and I1-3 are disposed in respective combination frames A1, A2 and A3 to be combined with the template. A new image can be created by collage-likely pasting the trimmed images to each other.

As described above, use of important portion of the image can compensate the shortage of image by picking up the subjects from the image and disposing the subjects.

According to a second exemplary embodiment, a new image is created by combining the original image for creation with a different background image or graphics.

Figure 8:
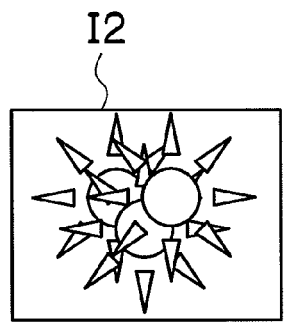
FIG. 8 is a diagram showing an example of a selected image including no personal subject.
Figure 9:
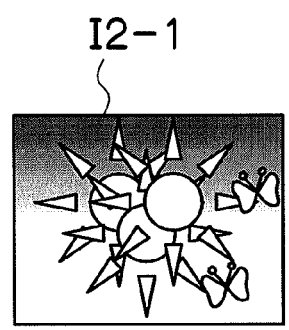
FIG. 9 is a diagram showing an example of a selected image with which an illustration is combined.
Figure 10:
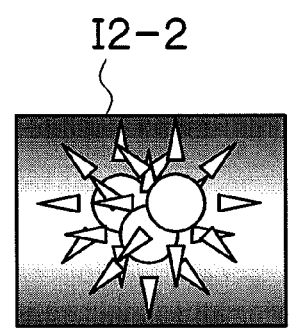
FIG. 10 is a diagram showing an example of a selected image with which an illustration is combined.
Figure 11:
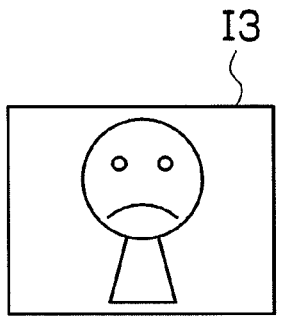
FIG. 11 is a diagram showing another example of a selected image including a personal subject.

For example, an image I2 shown in FIG. 8 whose subjects are flowers is combined with an illustration in which butterflies are flying around. As a result, a new image I2-1 shown in FIG. 9 is obtained. Alternatively, the image I2 is combined with an illustration whose edge portions are colored. As a result, a new image I2-2 shown in FIG. 10 is obtained.

Figure 12:
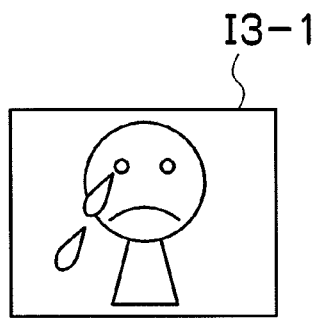
FIG. 12 is a diagram showing a selected image with which an illustration related to a facial expression of the personal subject is combined.
Figure 13:
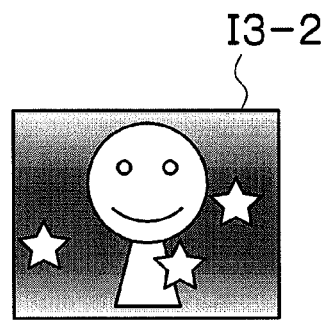
FIG. 13 is a diagram showing a selected image with which an illustration related to a facial expression of the personal subject is combined and to which an image processing for changing a facial expression is applied.

Alternatively, an image I3 whose subject is a person is combined with an illustration expressing the person's emotion (tear drops). As a result, a new image I3-1 shown in FIG. 12 is generated. Instead, in addition to combination of a star-shaped illustration, partial manipulation on the person's parts (the eyes, mouth and nose) changes the emotional expression. As a result, a new image I3-2 shown in FIG. 13 is obtained.

It depends on the content concerning the subject what kind of illustration is generated. For example, when a facial part of a personal subject is detected, the illustration shown in FIG. 12 or 13 is combined. When no facial part is detected, the illustration shown in FIG. 9 or 10 is combined. The illustration to be combined may be designated by the user using the operation unit 26.

Figure 14:
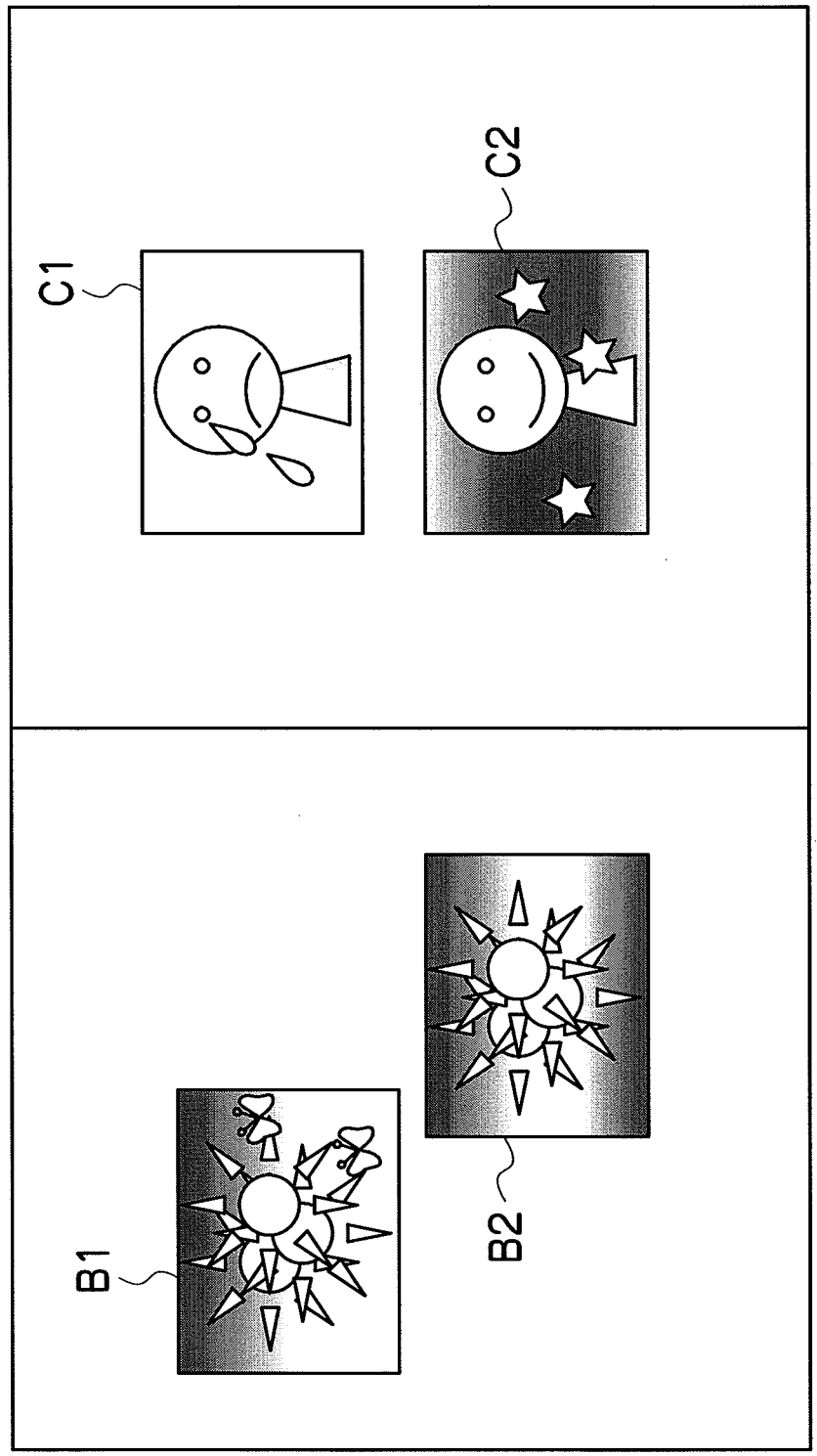
FIG. 14 is a diagram showing an appearance in which the selected images with combined illustrations are disposed in a template.

After that, as shown in FIG. 14, combination is executed by disposing the images I2-1, I2-2, I3-1 and I3-2 are disposed in respective combination frames B1, B2, C1 and C2.

Thus, the shortage of images can easily be compensated by generating the modified image based on the original image.

According to a third exemplary embodiment, pseudo-three-dimensional processing is applied to the original image for creation, and a plane image that represents a view of the pseudo-three-dimensional image from a desired viewpoint is created. A well-known art can be used for creating a pseudo-three-dimensional image from a plain image. For example, "Make3D" by Stanford University can be used for creation.

Figure 15C:
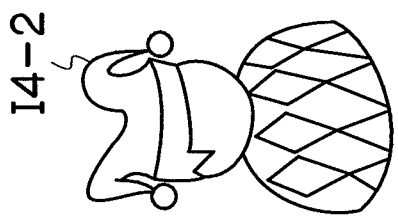
FIGS. 15A to 15C are diagrams schematizing a pseudo-three-dimensional processing.
Figure 15B:
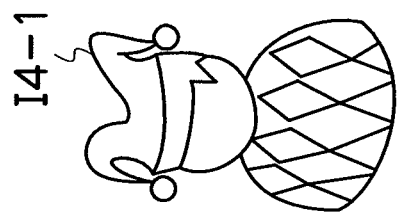
Figure 15A:
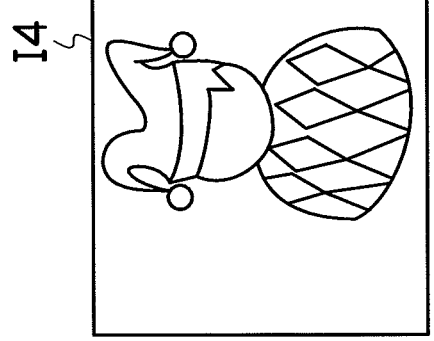

For example, the pseudo-three-dimensional image is created from a plane original image for creation 14 shown in FIG. 15A. An image, as shown in FIG. 15B, representing a view of the pseudo-three-dimensional image seen from a viewpoint on a right side of the front is provided as a new image I4-1. An image, as shown in FIG. 15C, representing a view of the pseudo-three-dimensional image seen from a viewpoint on a left side of the front is provided as a new image I4-2.

Figure 16:
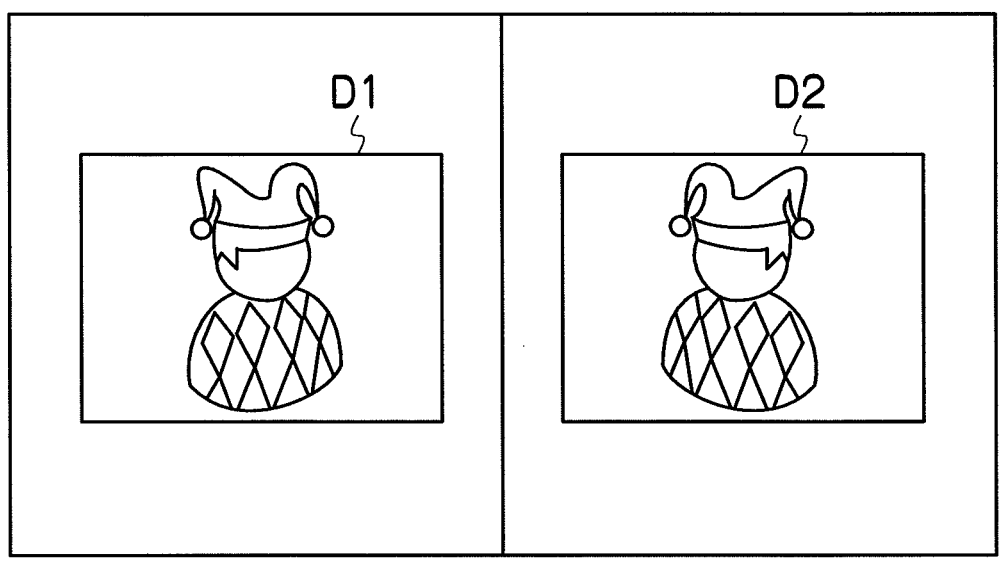
FIG. 16 is a diagram illustrating an appearance in which pseudo-three-dimensional images viewed from different viewpoints are disposed in a template.

After that, as shown in FIG. 16, the images I4-1 and I4-2 are combined with the template by being disposed in the corresponding combination frames D1 and D2, respectively.

Thus, use of a plurality of images representing views of the same person or scenery from different viewpoints can easily compensate the shortage of images, thereby enhancing impression on the album.

According to a fourth exemplary embodiment, morphing, which is an art expressing a transformation from one object to another object, is used, and an intermediate image representing a state in which an object is changing to a different one is created as a new image.

Figure 17A:
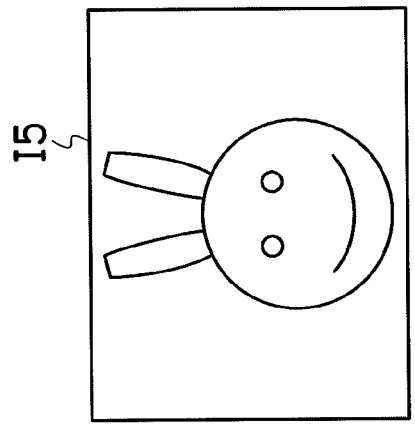
FIGS. 17A to 17C are diagrams schematizing morphing.
Figure 17B:
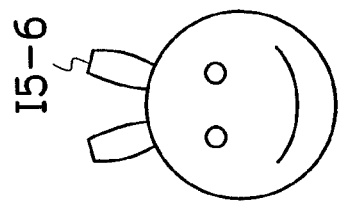
Figure 17C:
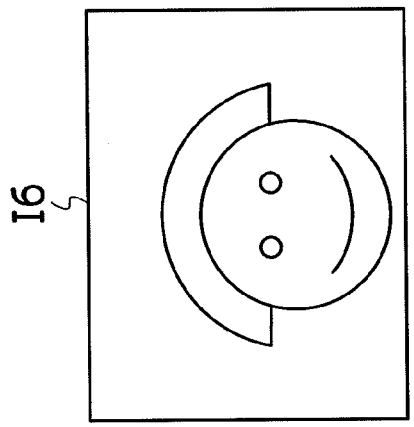

For example, an intermediate image I5-6 shown in FIG. 17B is created by morphing from a subject in pre-transformation image I5 shown in FIG. 17A whose subject is a pet to a subject in post-transformation image I6 shown in FIG. 17C whose subject is the pet owner. Thus, creation of an intermediate image requires that two images should be secured. A plurality of intermediate images, instead of only one, can be created.

After that, as shown in FIG. 18, the pre-transformation image I5, intermediate image I5-6 and post-transformation image I6 are combined with the template by being sequentially disposed on the combination frames E1, E2 and E3.

Thus, creation of the intermediate image by morphing based on the two images compensates the shortage of images, and enhances impression on the album.

According to a fifth exemplary embodiment, if the selected image is obtained by capturing a part of original moving image such as a motion JPEG or MPEG4 image, another image that belongs to the same scene to which the selected image belongs is captured from the same moving image as a new image.

Figure 19:
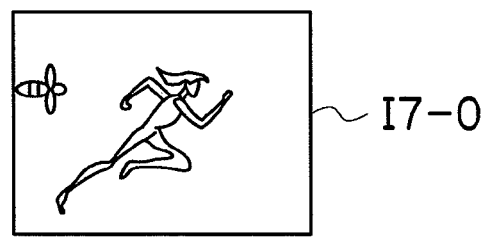
FIG. 19 is a diagram showing an example of a representative image.
Figure 20:
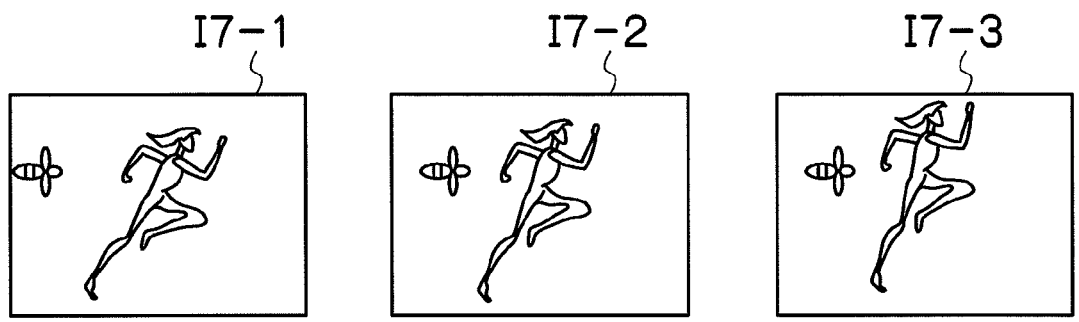
FIG. 20 is a diagram illustrating images of the same scene which are captured from a moving image centering on the representative image.

For example, if the selected image (representative image) I7-0 shown in FIG. 19 is a captured image of a part of a certain moving image, captured images I7-1, I7-2 and I7-3 shown in FIG. 20 that belong to the same scene to which the selected image belongs are generated from the moving image. A well-known method for determining a scene can be employed. For example, Japanese Patent Application Laid-Open No. 2003-9069 may be used. Alternatively, still image frames in a predetermined time span which frames are disposed before and after the representative image being disposed in the center, for example image frames in five seconds being disposed before and after the representative image, are captured, and then color temperatures of the representative image and each image frame are compared as described in Japanese Patent Application Laid-Open No. 2008-22216. It is determined that both images are in the same scene when both temperatures identically match to each other. It is determined that both images are in different scenes from each other when both temperatures are different from each other. Thus, image frames determined as those in the same scene (see FIG. 20) are selected.

Figure 21:
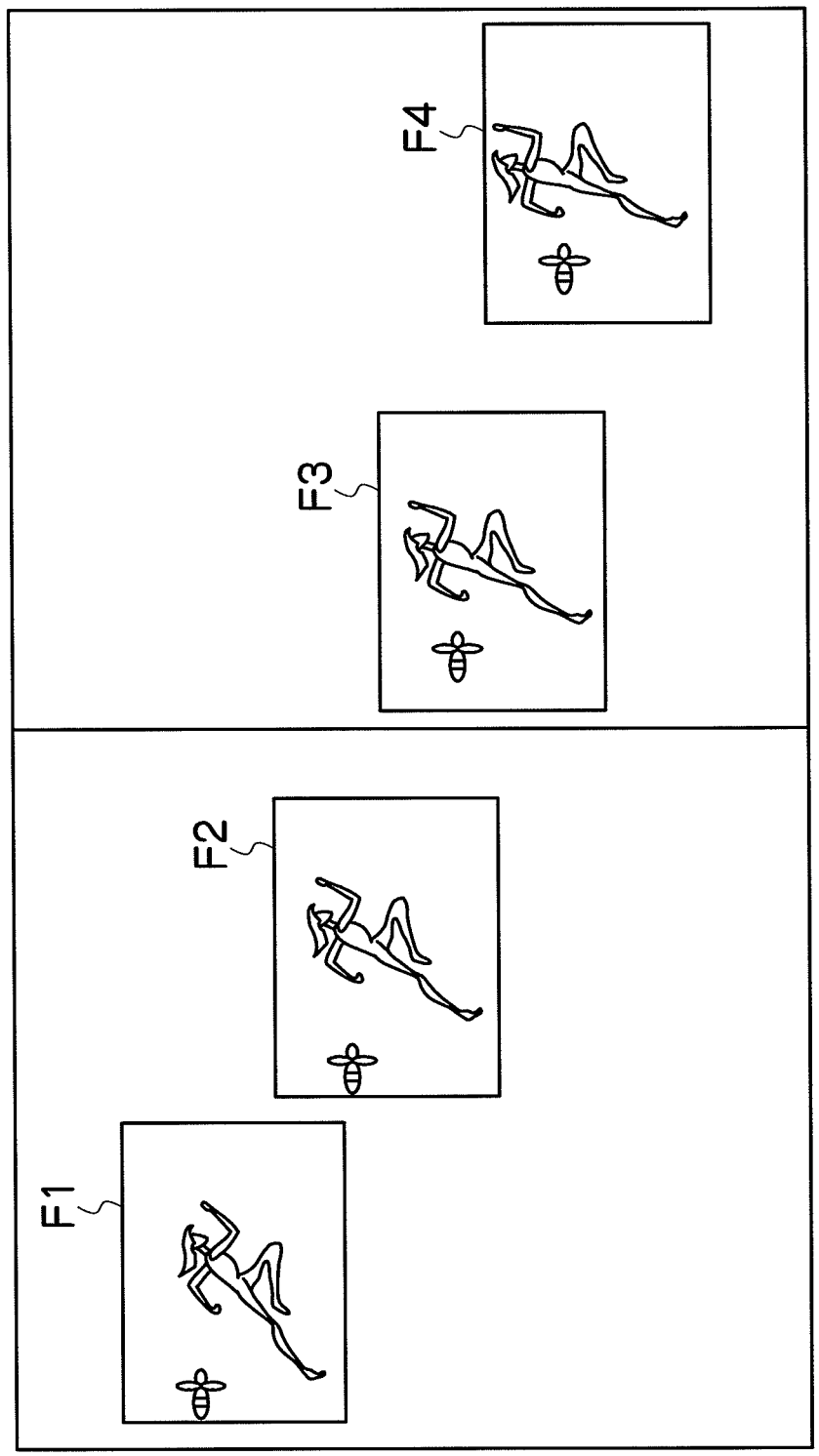
FIG. 21 is a diagram illustrating an example when the captured images of the same scene are disposed in a template.
Figure 22:
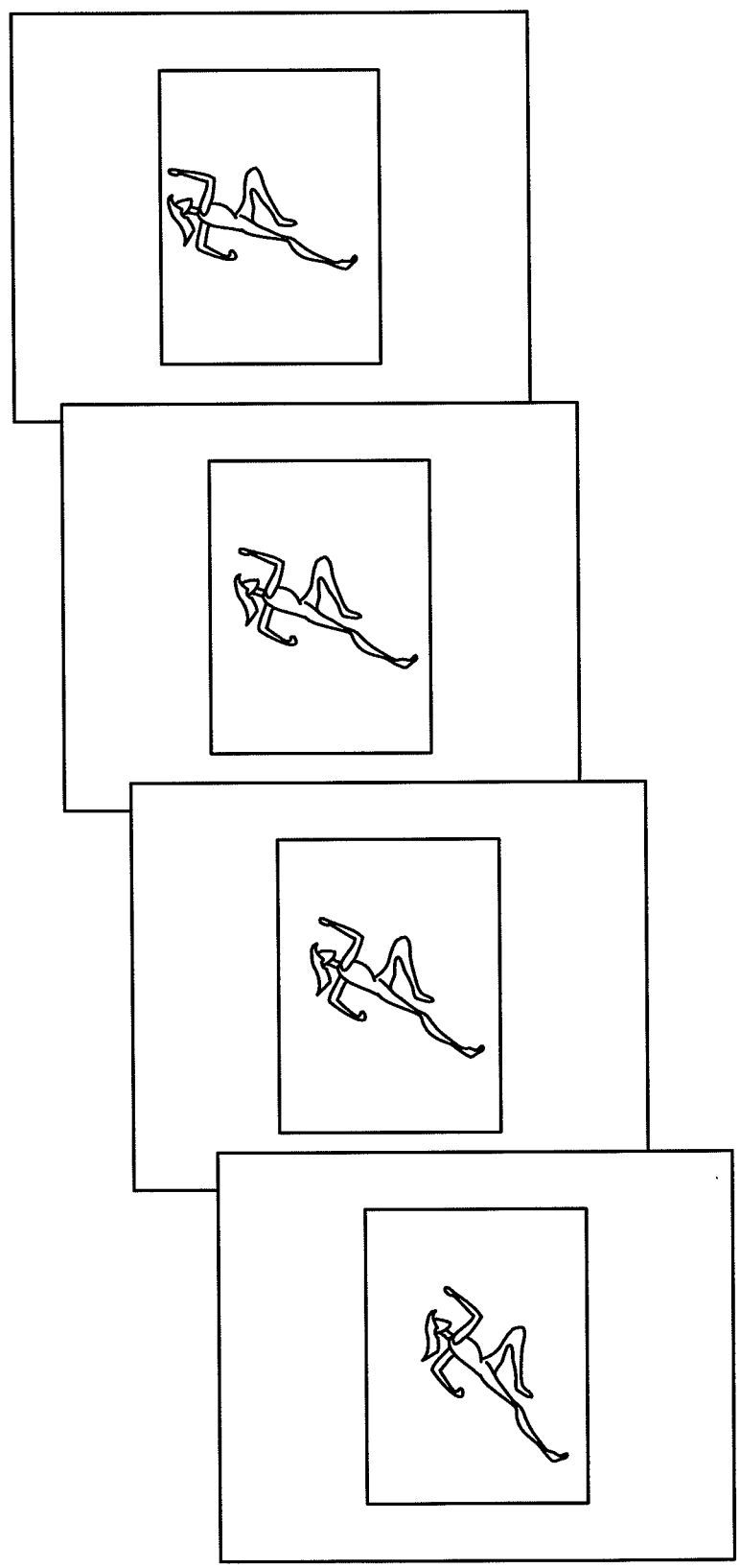
FIG. 22 is a diagram illustrating an example when the captured images of the same scene are sequentially disposed on different pages.

After that, as shown in FIG. 21, combination is executed by disposing the representative image I7-0, and the image frames I7-1, I7-2 and I7-3 that belong to the same scene to which the representative image I7-0 belongs in the combination frames F1, F2, F3 and F4, in a sequence along the time axis of playback of the moving image. In FIG. 21, the image frames in the same scene are disposed on two facing pages. Frames in a different scene can be disposed on another two facing pages.

The method of layout is not restricted to what is shown in FIG. 20. For example, as shown in FIG. 21, one page may be assigned to each frame, and the frames are disposed as in so-called a cutoff animation.

According to this method, a time continuity of images of the same scene can be disposed, thereby allowing a fine appearance.

It is required that at least the minimum number of shortfall images N should be created. More than N images may be created, images as many as the minimum number of shortfall images N that satisfy a predetermined condition (image quality, size) may be selected, and the selected images may be disposed in the combination frames.

Although, in the above description, it is assumed that the images are disposed in the combination frames in the template, the combination frames are not essential for executing the present invention. The present invention can also be applied to a photo album with free layout according to which each image can be disposed on an arbitrary position in a page. For example, if the number of original images are less than the number of images required for creating the photo album (typically, the number of pages of the album) N, images are generated until at least the number of images reaches N as shown in step S6. Which original and generated images are disposed on which pages depends on operational designation to the operation unit 26 by the user.

While examples and embodiments of the present invention have been explained in detail, the present invention is not limited to the above, needless to say, various improvements and modifications may be added without departing from the scope of the present invention.

What is claimed is:

1. A method for creating an album in which one or more images are disposed, comprising:
   a step of obtaining one or more original images;
   a step of selecting images which satisfy a predetermined first condition from among the original images, wherein the predetermined first condition includes a minimum number of pixels, an image quality, or a size of the image;
   a step of determining a number of shortfall images by subtracting the number of selected images from a number of images required for creating the album;
   a step of creating one or more compensating images at least as many as the number of shortfall images by applying a predetermined image processing to the selected images, wherein the predetermined image processing includes switching viewpoints by pseudo-three-dimensional processing; and
   a step of creating the album by filling the album with the original images and the compensating images.

2. A non-transitory computer readable recording medium on which a program is recorded, the program controlling a computer to execute the method for creating an album according to claim 1.

3. The method for creating an album according to claim 1, wherein the number of shortfall images represents a number of new images required to be created in addition to the obtained original images such that each frame of the album is occupied.

4. The method for creating an album according to claim 1, wherein the compensating images satisfy a second condition including a condition concerning the pixel numbers, quality, or size of the original image.

5. A method for creating an album in which one or more images are disposed, comprising:
   a step of obtaining a moving image and one or more representative images which are still images captured from the moving image;
   a step of selecting images which satisfy a predetermined first condition from among the representative images, wherein the predetermined first condition includes a minimum number of pixels, an image quality, or a size of the image;
   a step of determining a minimum number of images required for creating the album;
   a step of determining a number of shortfall images by subtracting the number of selected images from the minimum number of images required for creating the album;
   a step of creating one or more additional still images which belong to a same scene as the representative image by applying a predetermined image processing to the selected images, wherein the predetermined image processing includes switching viewpoints by pseudo-three-dimensional processing, the additional still images being created in at least as many as the number of shortfall images required for filling each remaining frame of the album; and
   a step of creating the album by filling the album with the still images and the additional still images which belong to the same scene as the created representative image.

6. A non-transitory computer readable recording medium on which a program is recorded, the program controlling a computer to execute the method for creating an album according to claim 5.

7. The method for creating an album according to claim 5, wherein the additional still images satisfy a predetermined second condition, wherein the predetermined second condition includes a condition concerning the pixel numbers, quality, or size of the additional still image.

8. An apparatus for creating an album in which one or more images are disposed, comprising:
   a processor;
   a device which obtains one or more original images;
   a device which selects images which satisfy a predetermined first condition from among the original images, wherein the predetermined first condition includes a minimum number of pixels, an image quality, or a size of the image;
   a device which determines a number of shortfall images by subtracting the number of selected images from a number of images required for creating the album;
   a device which creates one or more compensating images at least as many as the number of shortfall images by applying a predetermined image processing to the selected images, wherein the predetermined image processing includes switching viewpoints by pseudo-three-dimensional processing; and
   a device which creates the album by filling the album with the original images and the compensating images.

9. The apparatus of claim 8, wherein the compensating images satisfy a predetermined second condition, said second condition concerning pixel numbers, quality or size.

10. An apparatus for creating an album in which one or more images are disposed, comprising:
   a processor;
   a device which obtains a moving image and one or more representative images which are still images captured from the moving image;
   a device which selects images which satisfy a predetermined first condition from among the representative images, wherein the predetermined first condition includes a minimum number of pixels, an image quality, or a size of the image;
   a device which determines a minimum number of images required for creating the album;
   a device which determines a number of shortfall images by subtracting the number of selected images from the minimum number of images required for creating the album;
   a device which creates one or more additional still images which belong to a same scene as the representative image by applying a predetermined image processing to the selected images, wherein the predetermined image processing includes switching viewpoints by pseudo-three-dimensional processing, the additional still images being created in at least as many as the number of shortfall images required for filling each remaining frame of the album; and
   a device which creates the album by filling the album with the still images and the additional still images which belong to the same scene as the created representative image.

11. The apparatus of claim 10, wherein the additional still images satisfy a predetermined second condition, said second condition concerning pixel numbers, quality or size.

* * * * *